United States Patent
Jeong

(10) Patent No.: US 11,505,166 B2
(45) Date of Patent: Nov. 22, 2022

(54) APPARATUS AND METHOD FOR PARKING CONTROL OF VEHICLE

(71) Applicant: HYUNDAI MOBIS CO., LTD., Seoul (KR)

(72) Inventor: Hee Jeong, Yongin-si (KR)

(73) Assignee: HYUNDAI MOBIS CO., LTD., Seoul (KR)

( * ) Notice: Subject to any disclaimer, the term of this patent is extended or adjusted under 35 U.S.C. 154(b) by 286 days.

(21) Appl. No.: 16/776,842

(22) Filed: Jan. 30, 2020

(65) Prior Publication Data
US 2020/0238959 A1    Jul. 30, 2020

(30) Foreign Application Priority Data

Jan. 30, 2019  (KR) .................. 10-2019-0011758

(51) Int. Cl.
| | | |
|---|---|---|
| *B60T 7/12* | (2006.01) | |
| *B60T 17/22* | (2006.01) | |
| *F16H 63/48* | (2006.01) | |
| *F16H 63/34* | (2006.01) | |
| *F16H 59/44* | (2006.01) | |

(52) U.S. Cl.
CPC ............... *B60T 7/12* (2013.01); *B60T 17/22* (2013.01); *F16H 63/3466* (2013.01); *F16H 63/483* (2013.01); *B60T 2201/10* (2013.01); *B60T 2220/00* (2013.01); *B60T 2250/04* (2013.01); *B60T 2270/82* (2013.01); *F16H 2059/446* (2013.01)

(58) Field of Classification Search
CPC ........ B60T 7/12; B60T 17/22; B60T 2270/82; B60T 2201/10; B60T 2250/04; B60T 2220/00; F16H 63/483; F16H 63/3466; F16H 2059/446
See application file for complete search history.

(56) References Cited

U.S. PATENT DOCUMENTS

| | | | | |
|---|---|---|---|---|
| 6,997,289 B2 * | 2/2006 | Iwagawa | ................. | B60T 7/107 188/2 D |
| 9,463,800 B2 * | 10/2016 | Jang | .......................... | B60L 3/12 |
| 2009/0192019 A1 * | 7/2009 | Groner | .................... | B60T 7/122 477/195 |

(Continued)

FOREIGN PATENT DOCUMENTS

| | | | |
|---|---|---|---|
| EP | 1031487 A2 * | 8/2000 | |
| KR | 10-2013-0057120 A | 5/2013 | |

*Primary Examiner* — Pamela Rodriguez
(74) *Attorney, Agent, or Firm* — Morgan, Lewis & Bockius LLP

(57) ABSTRACT

Provided are an apparatus and a method for parking control of a vehicle and the method includes a step in which a control unit determines a driver's parking intention by receiving a brake signal, pressure of a master cylinder, and a position of a shift lever from a brake switch, a pressure detection unit, and a shift lever detection unit, respectively; a step in which the control unit determines a state of the vehicle by receiving an inclination, a wheel speed, and a vehicle speed from an inclination detection unit, a wheel speed detection unit, and a vehicle speed detection unit, respectively; a step in which the control unit determines a state of an electronic parking brake; and a step in which the control unit operates the electronic parking brake through an EPB driving unit.

9 Claims, 2 Drawing Sheets

(56) References Cited

U.S. PATENT DOCUMENTS

| | | | |
|---|---|---|---|
| 2012/0209479 A1* | 8/2012 | Yanagida | B60T 7/122 |
| | | | 701/51 |
| 2014/0012477 A1* | 1/2014 | Lu | B60T 8/17551 |
| | | | 701/78 |
| 2019/0193740 A1* | 6/2019 | Han | B60T 8/58 |
| 2019/0241163 A1* | 8/2019 | Sakaguchi | B60T 8/321 |

* cited by examiner

1

APPARATUS AND METHOD FOR PARKING CONTROL OF VEHICLE

CROSS-REFERENCE TO RELATED APPLICATION

The present application claims priority under 35 U.S.C. § 119(a) to Korean Patent Application No. 10-2019-0011758 filed on Jan. 30, 2019 in the Korean Intellectual Property Office, which is incorporated herein by reference in its entirety.

BACKGROUND

1. Technical Field

Embodiments of the present disclosure relate to an apparatus and a method for parking control of a vehicle, and more particularly, to an apparatus and a method for parking control of a vehicle, by which, when an automatic transmission vehicle is parked on a slope, it is possible to check the state of an electronic parking brake for a driver's safety and allow the vehicle to automatically maintain the stop state.

2. Related Art

In general, an automatic transmission is a transmission that automatically implements an appropriate gear stage (shift stage) based on variables related to vehicle driving such as a vehicle speed and an opening degree of a throttle valve.

Typically, an automatic transmission of a vehicle is connected to a shift lever for allowing a driver to specify a shift range such as P (parking), R (reverse), N (neutral), D (driving), +, and −, and the shift lever is also called a transmission gear shift (TGS) lever as a rod that connects a driver's operation for gear shift and the transmission.

By operating such a shift lever, the position of a manual valve of the automatic transmission is determined, and an appropriate hydraulic supply line according to the position of the shift lever is formed. The position of the manual valve is detected by an inhibitor switch and inputted to a transmission control unit (hereinafter, referred to as a 'TCU') that controls the transmission.

The TCU controls the hydraulic system of the automatic transmission so that an appropriate gear stage is established in a driving mode specified by a driver.

When such an automatic transmission has a manual up (+)/down (−) function, the operating position of the shift lever is transmitted to the TCU through CAN communication so that shift such as current gear stage maintenance, upshift, and downshift is performed by operating the shift lever, and thus shift control to a corresponding target gear stage is performed.

Furthermore, in the shift lever of the automatic transmission, the position of the shift lever such as P, R, N, and D is displayed on a letter part of a PRND indicator by lighting to visually inform a driver of the position of the shift lever.

Recently, shift by wire (SBW) shift levers are used a lot in high-end automobiles and electric automobiles, and in such a SBW shift lever, an operating state is transmitted to a control unit through communication.

Accordingly, in an automatic transmission vehicle provided with the SBW shift lever, when a driver selects the P, R, N, or D stage by a shift control device, only an electrical signal is transmitted to the transmission to perform a corresponding shift operation. When the driver selects the P stage for parking, a motor installed in the transmission is driven and a parking sprag is operated, so that the gear in the transmission is constrained.

The background art of the present disclosure is disclosed in Korean Patent Application Laid-Open No. 10-2013-0057120 published on May 31, 2013, entitled 'Control Method for Vehicle with Shift by Wire System'.

In the automatic transmission vehicle provided with the SBW shift lever, when the parking sprag is damaged due to stress, there is a problem that it is not possible to stop the vehicle even though P-stage parking is performed on the slope.

SUMMARY

Various embodiments are directed to providing an apparatus and a method for parking control of a vehicle, by which, when an automatic transmission vehicle is parked on a slope, it is possible to grasp a driver's P stage parking intention, check the speed of the vehicle and the state of an electronic parking brake for the driver's safety, and allow the vehicle to automatically maintain the stop state.

In an embodiment, an apparatus for parking control of a vehicle includes: a brake switch configured to output a brake signal as a brake is operated; a pressure detection unit configured to detect pressure of a master cylinder; a shift lever detection unit configured to detect a position of a shift lever; an inclination detection unit configured to detect an inclination of the vehicle; a wheel speed detection unit configured to detect a wheel speed of the vehicle; a vehicle speed detection unit configured to detect a driving speed of the vehicle; an EPB (electronic parking brake) state detection unit configured to detect an operation state of an electronic parking brake; an EPB driving unit configured to operate the electronic parking brake; and a control unit configured to determine a driver's parking intention based on the brake signal, the pressure of the master cylinder, and the position of the shift lever, determine a state of the vehicle based on the inclination, the wheel speed, and the vehicle speed, and operate the electronic parking brake through the EPB driving unit according to the operation state of the electronic parking brake, which is detected by the EPB state detection unit, in order to substantially maintain a stop state of the vehicle.

In the present disclosure, when the brake signal is turned on, the pressure of the master cylinder exceeds preset pressure, and the position of the shift lever is a P stage, the control unit sets the driver's parking intention.

In the present disclosure, when the inclination exceeds a preset degree of a slope, the wheel speed exceeds a preset wheel speed, and the vehicle speed exceeds a preset vehicle speed, the control unit sets the state of the vehicle as an increase in the vehicle speed.

In the present disclosure, in a case where the driver's parking intention is set and the state of the vehicle is set as an increase in the vehicle speed, when the operation state of the electronic parking brake is normal, the control unit operates the electronic parking brake.

In another embodiment, a method for parking control of a vehicle includes: a step in which a control unit determines a driver's parking intention by receiving a brake signal, pressure of a master cylinder, and a position of a shift lever from a brake switch, a pressure detection unit, and a shift lever detection unit, respectively; a step in which the control unit determines the state of the vehicle by receiving an inclination, a wheel speed, and a vehicle speed from an inclination detection unit, a wheel speed detection unit, and a vehicle speed detection unit, respectively; a step in which the control unit determines the state of an electronic parking brake; and a step in which the control unit operates the electronic parking brake through an EPB driving unit according to the driver's parking intention, the state of the vehicle, and the operation state of the electronic parking brake.

In the present disclosure, in the step of determining the driver's parking intention, when the brake signal is turned on, the pressure of the master cylinder exceeds preset pressure, and the position of the shift lever is a P stage, the control unit sets the driver's parking intention.

In the present disclosure, in the step of determining the state of the vehicle, when the inclination exceeds a preset degree of a slope, the wheel speed exceeds a preset wheel speed, and the vehicle speed exceeds a preset vehicle speed, the control unit sets the state of the vehicle as an increase in the vehicle speed.

In the present disclosure, in the step of operating the electronic parking brake, in a case where the driver's parking intention is set and the state of the vehicle is set as an increase in the vehicle speed, when the operation state of the electronic parking brake is normal, the control unit operates the electronic parking brake.

According to the apparatus and the method for parking control of the vehicle, when an automatic transmission vehicle is parked on a slope, it is possible to grasp the driver's P stage parking intention, check the speed of the vehicle and the state of the electronic parking brake, and allow the vehicle to automatically maintain the stop state, thereby increasing the safety of a pedestrian and a driver.

DETAILED DESCRIPTION

Figure 1:
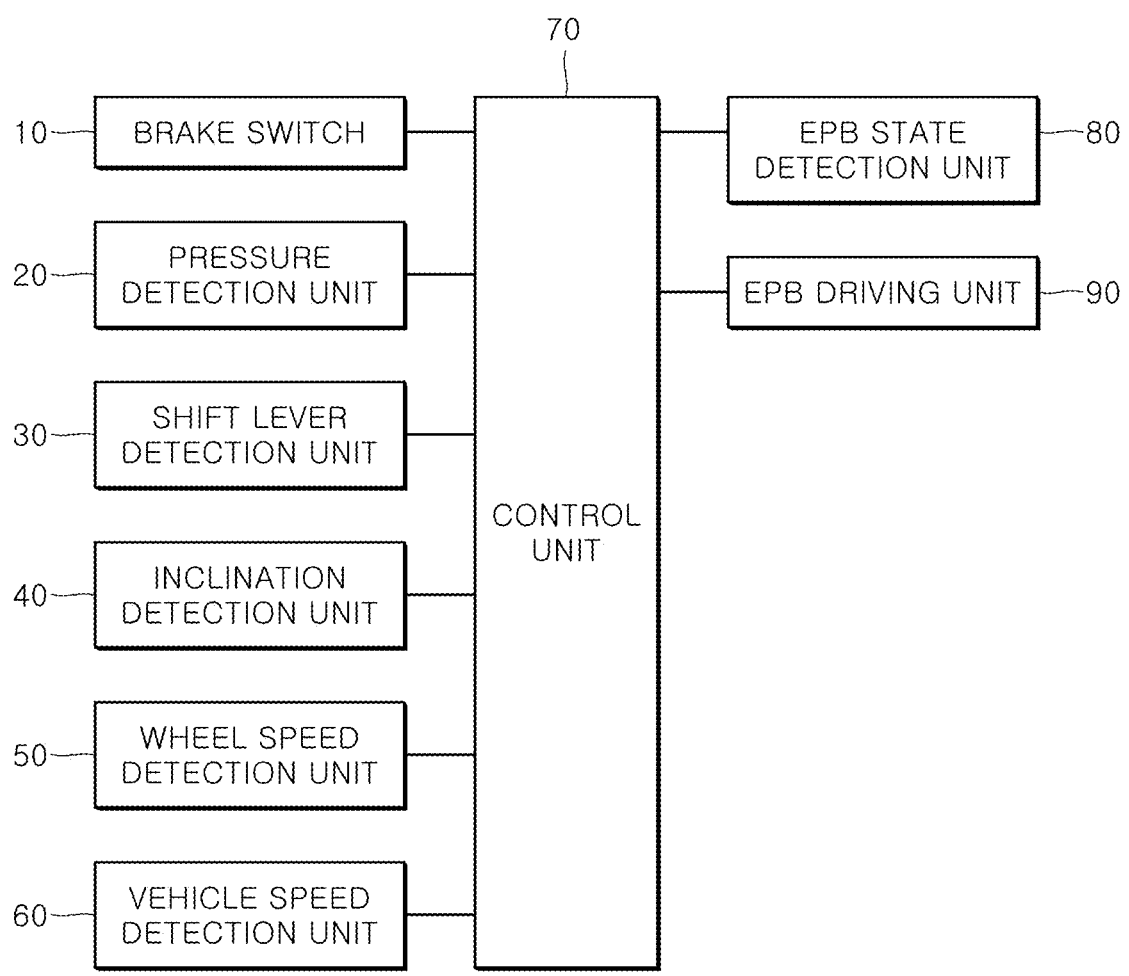
FIG. 1 is a block configuration diagram illustrating an apparatus for parking control of a vehicle in accordance with an embodiment of the present disclosure.

As is traditional in the corresponding field, some exemplary embodiments may be illustrated in the drawings in terms of functional blocks, units, and/or modules. Those of ordinary skill in the art will appreciate that these block, units, and/or modules are physically implemented by electronic (or optical) circuits such as logic circuits, discrete components, processors, hard-wired circuits, memory elements, wiring connections, and the like. When the blocks, units, and/or modules are implemented by processors or similar hardware, they may be programmed and controlled using software (e.g., code) to perform various functions discussed herein. Alternatively, each block, unit, and/or module may be implemented by dedicated hardware or as a combination of dedicated hardware to perform some functions and a processor (e.g., one or more programmed processors and associated circuitry) to perform other functions. Each block, unit, and/or module of some exemplary embodiments may be physically separated into two or more interacting and discrete blocks, units, and/or modules without departing from the scope of the inventive concept. Further, blocks, units, and/or module of some exemplary embodiments may be physically combined into more complex blocks, units, and/or modules without departing from the scope of the inventive concept.

Hereinafter, an apparatus and a method for parking control of a vehicle in accordance with an embodiment of the present disclosure will be described in detail with reference to the accompanying drawings. It should be noted that the drawings are not to precise scale and may be exaggerated in thickness of lines or sizes of components for descriptive convenience and clarity only. Furthermore, the terms as used herein are defined by taking functions of the disclosure into account and can be changed according to the custom or intention of users or operators. Therefore, definition of the terms should be made according to the overall disclosures set forth herein.

FIG. 1 is a block configuration diagram of an apparatus for parking control of a vehicle in accordance with an embodiment of the present disclosure.

As illustrated in FIG. 1, an apparatus for parking control of a vehicle in accordance with an embodiment of the present disclosure may include a brake switch 10, a pressure detection unit 20, a shift lever detection unit 30, an inclination detection unit 40, a wheel speed detection unit 50, a vehicle speed detection unit 60, and an EPB state detection unit 80, an EPB driving unit 90, and a control unit 70.

The brake switch 10 may output a brake signal for turning on a brake lamp (not illustrated) to recognize a state, in which a brake is operated, when a driver presses a brake pedal (not illustrated) to operate the brake.

Accordingly, as the brake operates, the brake switch 10 outputs the brake signal to the control unit 70 so as to grasp the driver's braking intention.

The pressure detection unit 20 detects pressure of a master cylinder and provides the detected pressure to the control unit 70 so that the control unit 70 may grasp the validity of the driver's braking intention.

The shift lever detection unit 30 detects a position of a shift lever and provides the detected position to the control unit 70 so that the control unit 70 may grasp the P stage parking intention based on the position of the shift lever.

The inclination detection unit 40 detects an inclination of the vehicle based on a gyro sensor and provides the detected inclination to the control unit 70 so that the control unit 70 may grasp the parking intention on the slope.

The wheel speed detection unit 50 detects a wheel speed of the vehicle and provides the detected wheel speed to the control unit 70 so that the control unit 70 may grasp the movement state of the vehicle.

The vehicle speed detection unit 60 may detect a driving speed of the vehicle and provide the detected driving speed to the control unit 70, or provide a vehicle speed received from an engine control unit (not illustrated) to the control unit 70.

Accordingly, the control unit 70 may determine the validity of the movement of the vehicle.

The EPB (electronic parking brake) state detection unit 80 detects an operation state of an electronic parking brake (not illustrated) and provides the detected operation state to the control unit 70 so that the control unit 70 may operate the electronic parking brake in a normal state.

The EPB (electronic parking brake) driving unit 90 may allow a stop state of the vehicle to be substantially maintained by operating the electronic parking brake according to a control signal of the control unit 70.

The control unit 70 may determine a driver's parking intention by receiving the brake signal, the pressure of the master cylinder, and the position of the shift lever from the brake switch 10, the pressure detection unit 20, and the shift lever detection unit 30, respectively, and then determine the state of the vehicle by receiving the inclination, the wheel speed, and the vehicle speed from the inclination detection unit 40, the wheel speed detection unit 50, and the vehicle speed detection unit 60, respectively, thereby operating the electronic parking brake through the EPB driving unit 90 according to the operation state of the electronic parking brake, which is detected by the EPB state detection unit 80, in order to substantially maintain the stop state of the vehicle.

Herein, the control unit 70 may first determine the driver's parking intention. For example, when the brake signal is turned on, the pressure of the master cylinder exceeds preset pressure, and the position of the shift lever is the P stage, that is, when all the conditions are satisfied, the control unit 70 may set the driver's parking intention.

In such a case, the control unit 70 may set the driver's parking intention by setting or initializing a flag according to the state of the brake signal, the pressure state of the master cylinder, and the position state of the shift lever.

Next, the control unit 70 may determine the state of the vehicle. For example, when the inclination exceeds a preset degree of a slope, the wheel speed exceeds a preset wheel speed, and the vehicle speed exceeds a preset vehicle speed, the control unit 70 may set the state of the vehicle as an increase in the vehicle speed. That is, when all the above conditions are satisfied, the control unit 70 may determine that the vehicle is moving on the slope.

In such a case, the control unit 70 may set the state of the vehicle by setting or initializing a flag according to the state of the inclination, whether the wheel speed increases, and whether the vehicle speed increases.

Then, when the driver's parking intention is set and the state of the vehicle is set as an increase in the vehicle, the control unit 70 may determine that the vehicle is moving on the slope in the P stage parking state, and automatically operate the electronic parking brake through the EPB driving unit 90 to allow the stop state of the vehicle to be substantially maintained when the operation state of the electronic parking brake is normal.

As described above, according to the apparatus and the method for parking control of the vehicle, when the automatic transmission vehicle is parked on the slope, it is possible to grasp the driver's P stage parking intention, check the speed of the vehicle and the state of the electronic parking brake, and allow the vehicle to automatically maintain the stop state, thereby increasing the safety of a pedestrian and a driver.

Figure 2:
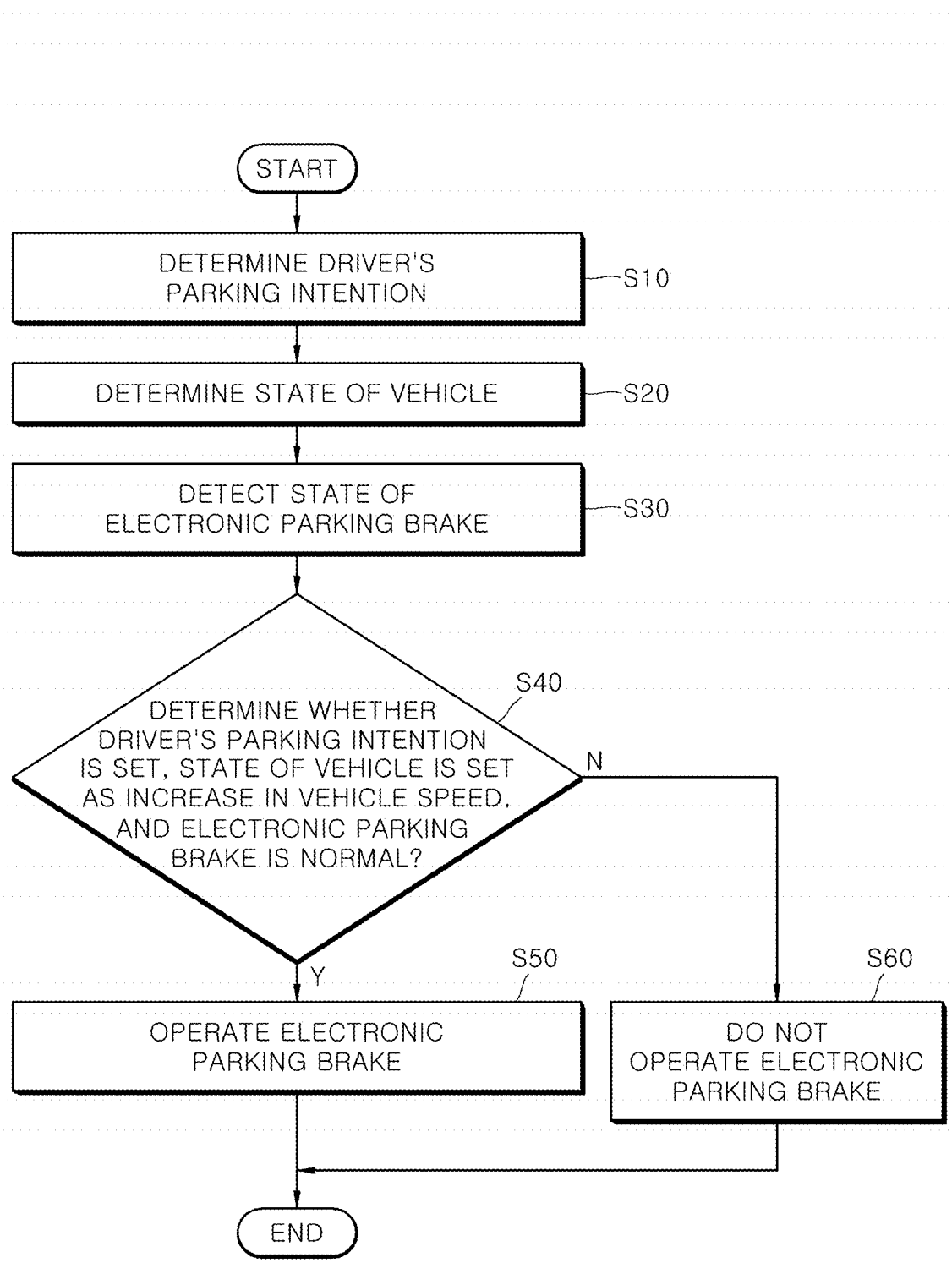
FIG. 2 is a flowchart for explaining a method for parking control of a vehicle in accordance with an embodiment of the present disclosure.

FIG. 2 is a flowchart for explaining the method for parking control of the vehicle in accordance with an embodiment of the present disclosure.

As illustrated in FIG. 2, in the method for parking control of the vehicle in accordance with an embodiment of the present disclosure, the control unit 70 first determines the driver's parking intention by receiving the brake signal, the pressure of the master cylinder, and the position of the shift lever from the brake switch 10, the pressure detection unit 20, and the shift lever detection unit 30, respectively (S10).

For example, when the brake signal is turned on, the pressure of the master cylinder exceeds preset pressure, and the position of the shift lever is the P stage, that is, when all the conditions are satisfied, the control unit 70 may set the driver's parking intention.

In such a case, the control unit 70 may set the driver's parking intention by setting or initializing a flag according to the state of the brake signal, the pressure state of the master cylinder, and the position state of the shift lever.

After determining the driver's parking intention in step S10, the control unit 70 determines the state of the vehicle by receiving the inclination, the wheel speed, and the vehicle speed from the inclination detection unit 40, the wheel speed detection unit 50, and the vehicle speed detection unit 60, respectively (S20).

For example, when the inclination exceeds a preset degree of a slope, the wheel speed exceeds a preset wheel speed, and the vehicle speed exceeds a preset vehicle speed, the control unit 70 may set the state of the vehicle as an increase in the vehicle speed. That is, when all the above conditions are satisfied, the control unit 70 may determine that the vehicle is moving on the slope.

In such a case, the control unit 70 may set the state of the driver' vehicle by setting or initializing a flag according to the state of the inclination, whether the wheel speed increases, and whether the vehicle speed increases.

After determining the state of the vehicle in step S20, the control unit 70 detects the state of the electronic parking brake through the EPB state detection unit 80 (S30).

After detecting the state of the electronic parking brake in step S30, the control unit 70 determines whether the driver's parking intention is set, the state of the vehicle is set as an increase in the vehicle speed, and the operation state of the electronic parking brake is normal (S40).

That is, in step S40, the control unit 70 determines whether there is the driver's parking intention, the vehicle is moving in the P stage parking state, and the operation state of the electronic parking brake is normal.

When all the conditions are satisfied in the determination result of step S40, the control unit 70 allows the stop state of the vehicle to be automatically maintained by operating the electronic parking brake (S50).

However, when any one of the conditions is not satisfied in the determination result of step S40, the control unit 70 does not operate the electronic parking brake (S60).

As described above, according to the apparatus and the method for parking control of the vehicle, when the automatic transmission vehicle is parked on the slope, it is possible to grasp the driver's P stage parking intention, check the speed of the vehicle and the state of the electronic parking brake, and allow the vehicle to automatically maintain the stop state, thereby increasing the safety of a pedestrian and a driver.

The implementations described in the present specification may be implemented with a method or process, an apparatus, a software program, and a data stream or signal, for example. Although discussed only in the context of a single form of implementation (for example, discussed only as a method), implementations of the discussed features may also be implemented as other forms (for example, an apparatus or a program). The apparatus may be implemented with appropriate hardware, software, firmware and the like. The method may be implemented in an apparatus such as a processor generally referring to a processing device including a computer, a microprocessor, an integrated circuit, or a programmable logic device. The processor includes a communication device such as a computer, a cellular phone, a portable/personal digital assistant (PDA), and other devices that facilitate communication of information between end users.

Although the present disclosure have been described with reference to the embodiments illustrated in the drawings, the embodiments of the disclosure are for illustrative purposes only, and those skilled in the art will appreciate that various modifications and equivalent other embodiments are possible.

Thus, the true technical scope of the disclosure should be defined by the following claims.

What is claimed is:

1. An apparatus for parking control of a vehicle, the apparatus comprising:
a brake switch configured to output a brake signal as a brake is operated;
a pressure detection unit configured to detect pressure of a master cylinder;
a shift lever detection unit configured to detect a position of a shift lever;
an inclination detection unit configured to detect an inclination of the vehicle;
a wheel speed detection unit configured to detect a wheel speed of the vehicle;
a vehicle speed detection unit configured to detect a driving speed of the vehicle;
an EPB (electronic parking brake) state detection unit configured to detect an operation state of an electronic parking brake;
an EPB (electronic parking brake) driving unit configured to operate the electronic parking brake; and
a control unit configured to determine a driver's parking intention based on the brake signal, the pressure of the master cylinder, and the position of the shift lever, determine a state of the vehicle based on the inclination, the wheel speed, and the vehicle speed, and operate the electronic parking brake through the EPB driving unit according to the operation state of the electronic parking brake when the control unit determines that the vehicle is moving on a slope while the vehicle is in a parking state, in order to substantially maintain a stop state of the vehicle.

2. The apparatus according to claim 1, wherein, when the brake signal is turned on, the pressure of the master cylinder exceeds preset pressure, and the position of the shift lever is a P stage, the control unit sets the driver's parking intention.

3. The apparatus according to claim 1, wherein, when the inclination exceeds a preset degree of a slope, the wheel speed exceeds a preset wheel speed, and the vehicle speed exceeds a preset vehicle speed, the control unit sets the state of the vehicle as an increase in the vehicle speed.

4. The apparatus according to claim 1, wherein, in a case where the driver's parking intention is set and the state of the vehicle is set as an increase in the vehicle speed, when the operation state of the electronic parking brake is normal, the control unit operates the electronic parking brake.

5. A method for parking control of a vehicle, the method comprising:
a step in which a control unit determines a driver's parking intention by receiving a brake signal, pressure of a master cylinder, and a position of a shift lever from a brake switch, a pressure detection unit, and a shift lever detection unit, respectively;
a step in which the control unit determines a state of the vehicle by receiving an inclination, a wheel speed, and a vehicle speed from an inclination detection unit, a wheel speed detection unit, and a vehicle speed detection unit, respectively;
a step in which the control unit determines a state of an electronic parking brake; and
a step in which the control unit operates the electronic parking brake through an EPB driving unit according to the driver's parking intention, the state of the vehicle, and the operation state of the electronic parking brake,
wherein the control unit operates the electronic parking brake when the vehicle is moving on the slope while the vehicle is in a parking state.

6. The method according to claim 5, wherein, in the step of determining the driver's parking intention, when the brake signal is turned on, the pressure of the master cylinder exceeds preset pressure, and the position of the shift lever is a P stage, the control unit sets the driver's parking intention.

7. The method according to claim 5, wherein, in the step of determining the state of the vehicle, when the inclination exceeds a preset degree of a slope, the wheel speed exceeds a preset wheel speed, and the vehicle speed exceeds a preset vehicle speed, the control unit sets the state of the vehicle as an increase in the vehicle speed.

8. The method according to claim 5, wherein, in the step of operating the electronic parking brake, in a case where the driver's parking intention is set and the state of the vehicle is set as an increase in the vehicle speed, when the operation state of the electronic parking brake is normal, the control unit operates the electronic parking brake.

9. An apparatus for parking control of a vehicle, the apparatus comprising:
a brake switch configured to output a brake signal as a brake is operated;
a pressure detection unit configured to detect pressure of a master cylinder;
a shift lever detection unit configured to detect a position of a shift lever;
an inclination detection unit configured to detect an inclination of the vehicle;
a wheel speed detection unit configured to detect a wheel speed of the vehicle;
a vehicle speed detection unit configured to detect a driving speed of the vehicle;
an EPB (electronic parking brake) state detection unit configured to detect an operation state of an electronic parking brake;
an EPB (electronic parking brake) driving unit configured to operate the electronic parking brake; and
a controller configured to:
determine whether there is a driver's intention to park based on output and detection results of the brake switch, the pressure detection unit, the shift lever detection unit,
determine whether the vehicle is moving on a slope based on detection results of the inclination detection unit, the wheel speed detection unit, and the vehicle speed detection unit, and
operate the electronic parking brake through the EPB driving unit and allow a stop state of the vehicle to be substantially maintained when it is determined that there is the driver's intention to park and that the vehicle is moving on the slope in a parking state and when the operation state of the electronic parking brake is normal.

* * * * *